United States Patent
Dietz et al.

(10) Patent No.: US 11,269,309 B2
(45) Date of Patent: Mar. 8, 2022

(54) ANALYSIS UNIT AND METHOD FOR DETERMINING AT LEAST ONE FORMING PROCESS CHARACTERISTIC OF A SERVO PRESS

(71) Applicant: Siemens Aktiengesellschaft, Munich (DE)

(72) Inventors: Bernd Dietz, Herzogenaurach (DE); Gerald Reichl, Erlangen (DE); Elmar Schäfers, Fürth (DE); Tina Stöckel, Bubenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 149 days.

(21) Appl. No.: 16/531,973

(22) Filed: Aug. 5, 2019

(65) Prior Publication Data

US 2020/0041975 A1 Feb. 6, 2020

(30) Foreign Application Priority Data

Aug. 6, 2018 (EP) .................................... 18187524

(51) Int. Cl.
*G05B 19/404* (2006.01)

(52) U.S. Cl.
CPC .. *G05B 19/404* (2013.01); *G05B 2219/37205* (2013.01); *G05B 2219/37344* (2013.01); *G05B 2219/37357* (2013.01)

(58) Field of Classification Search
CPC ........ G05B 19/404; G05B 2219/37344; G05B 2219/37357; G05B 2219/37205;
(Continued)

(56) References Cited

U.S. PATENT DOCUMENTS

| 5,857,366 A | 1/1999 | Koyama |
| 7,886,564 B2 * | 2/2011 | Suzuki ................... B21D 24/10 |
| | | 72/14.9 |

(Continued)

FOREIGN PATENT DOCUMENTS

| CN | 2759769 Y | 2/2006 |
| CN | 1958279 | 5/2007 |

(Continued)

OTHER PUBLICATIONS

Office Action dated Jan. 7, 2021 issued Chinese Patent Application No. 201910718821.1.

(Continued)

*Primary Examiner* — Charles R Kasenge
(74) *Attorney, Agent, or Firm* — Cozen O'Connor

(57) ABSTRACT

An analysis unit and method for determining at least one forming process characteristic of a servo press includes the steps of determining a torque profile of a motor of the servo press, wherein the torque profile belongs to a first cycle of the servo press and wherein the first cycle describes a forming process without an item to be processed by the servo press, determining a torque profile of the motor of the servo press, wherein the torque profile belongs to a second cycle of the servo press and wherein the second cycle describes a forming process with an item to be processed by the servo press, and comparing the torque profile belonging to the first cycle with the torque profile belonging to the second cycle to ascertain the at least one forming process characteristic.

21 Claims, 5 Drawing Sheets

(58) Field of Classification Search
CPC ........... G05B 2219/37391; G05B 2219/37619; G05B 2219/45143; B30B 15/26
See application file for complete search history.

(56) References Cited

U.S. PATENT DOCUMENTS

| | | | | |
|---|---|---|---|---|
| 8,047,131 B2* | 11/2011 | Onishi | .................. | B30B 15/148 100/35 |
| 8,091,395 B2* | 1/2012 | Suzuki | .................. | B21D 24/10 72/14.9 |
| 2008/0092620 A1* | 4/2008 | Suzuki | .................. | B21D 24/10 72/343 |
| 2008/0178676 A1* | 7/2008 | Liasi | ........................ | G01H 1/00 73/593 |
| 2009/0007622 A1* | 1/2009 | Segura Golorons | .. | B30B 15/148 72/444 |
| 2009/0112488 A1 | 4/2009 | Haberl et al. | | |
| 2009/0177306 A1* | 7/2009 | Bosga | ............. | G05B 19/41815 700/103 |
| 2010/0170405 A1* | 7/2010 | Onishi | .................... | B30B 1/266 100/35 |
| 2011/0094279 A1* | 4/2011 | Suzuki | .................. | B21D 24/10 72/17.3 |
| 2016/0107407 A1* | 4/2016 | Reisch | ................ | B30B 15/0094 100/35 |
| 2018/0072010 A1* | 3/2018 | Kurokawa | ............. | G05B 19/25 |
| 2018/0290414 A1* | 10/2018 | Kurokawa | .......... | B30B 15/0094 |

FOREIGN PATENT DOCUMENTS

| | | |
|---|---|---|
| CN | 103660361 | 3/2014 |
| DE | 69529526 | 11/2003 |
| DE | 102013105468 | 12/2014 |
| EP | 2048556 | 4/2009 |
| WO | WO2008/119090 | 10/2008 |

OTHER PUBLICATIONS

Office Action dated Aug. 6, 2021 issued in Chinese Patent Application No. 201910718821.1.

* cited by examiner

ANALYSIS UNIT AND METHOD FOR DETERMINING AT LEAST ONE FORMING PROCESS CHARACTERISTIC OF A SERVO PRESS

BACKGROUND OF THE INVENTION

1. Field of the Invention

The invention relates to a method for determining at least one forming process characteristic of a servo press and an analysis unit for ascertaining the forming process characteristic of the servo press.

2. Description of the Related Art

The field of forming technology has disclosed presses and, more particularly, servo presses which, within a forming process, form a workpiece or an item to be processed from a certain material. Here, the material is pressed into a die, for example. During this forming process, a forming force or process force acts on the workpiece. Further values characteristic for a forming process are, for example, technological characteristics such as a forming force over a forming distance, a forming energy, a forming power over a forming distance or an accuracy of a forming movement. Until now, such technological characteristics have only been certain in cases where additional external measurement technology is attached to a press apparatus. Such a measurement on a press in operation is very complicated. Moreover, such a measurement must be adapted specifically to a servo press.

SUMMARY OF THE INVENTION

In view of the foregoing, it is an object of the present invention to provide an improved and simplified method for determining a forming process characteristic of a servo press.

This and other objects and advantages are achieved in accordance with the invention by a method for determining at least one forming process characteristic of a servo press, comprising at least the steps of determining a torque profile of a motor of the servo press, said torque profile belonging to a first cycle of the servo press, where the first cycle describes a forming process without an item to be processed by the servo press; determining a torque profile of the motor of the servo press, said torque profile belonging to a second cycle of the servo press, where the second cycle describes a forming process with an item to be processed by the servo press; and comparing the torque profile belonging to the first cycle with the torque profile belonging to the second cycle to ascertain the at least one forming process characteristic.

The torque profile over time can be represented from the information, available in the controller, about the torque of the servo press motor. Consequently, the torque acting in a cycle of the servo press is described. Here, a cycle describes a stroke, for example. Here, a cycle in which the servo press performs a stroke without an item to be processed or a workpiece being formed in the process is referred to as a first cycle. As it were, the servo press is empty or not filled with a material to be pressed in the process. An entire stroke or stroke process of the servo press in which an item to be processed is formed by the servo press is referred to as a second cycle. Here, the terms of first cycle and second cycle should not imply any temporal relationship. At least in theory, the sequence or the time should have no noticeable influence on the expected torque profile.

Over an entire cycle of a servo press, the two torque profiles, i.e., the torque profile belonging to the first cycle and the torque profile belonging to the second cycle, differ precisely in the time period during which the forming process occurs. Here, the assumption is made, in particular, that the respective torque profile is applied over a comparable period of time, i.e., each starting and ending at an identical crank angle, for example. Consequently, the time intervals in which the forming occurs or would occur, but is not performed on account of a no-load operation, lie above one another when plotted in a common diagram. The same applies to an analysis of the values of the torque profiles using another method than diagrams, such as if tables are used. Accordingly, deviations can then be determined for the values that each describe the torque at the time of the actual forming process or the theoretically occurring forming process.

The torque profile during the period in which the forming process occurs runs at significantly higher values for the run-through of the second cycle with forming process than the torque profile as may be observed in the first cycle without a forming process.

The deviation that exists between the torque profile of the first cycle and the torque profile of the second cycle is suitable for ascertaining at least one or more forming process characteristics.

Comparing the torque profile belonging to the first cycle with the torque profile belonging to the second cycle may yield deviations that are different and/or characteristic depending on the servo press and/or depending on the item to be processed. In particular, the ascertained forming process characteristic may provide information about an expected course of the forming. By way of example, a certain time profile of the deviation is expected depending on the servo press or servo press type and/or depending on the workpiece.

The forming process characteristic should also be understood to mean a profile of forming process variables, plotted over a further variable, for example, over time or over distance. By way of example, a plurality of forming process characteristics are ascertained and plotted or the forming process characteristic is a function of distance or time. Further, a forming process characteristic can be ascertained from a profile of forming process characteristics, for example, by integration or other calculation steps. The forming process characteristic or the profile thereof as a function of time or location can also be referred to as a fingerprint. By way of example, such a fingerprint can be transmitted, via an edge device or directly, to a cloud, a comparison with fingerprints of comparable servo presses, tools or materials occurring in said cloud. By way of example, correlations that indicate typical forming process characteristics under certain forming process conditions may be determined within the scope of such a comparison with data from the cloud.

Consequently, advantageous insights can be obtained for the purposes of optimizing the servo press or a forming process. The forming process characteristic can be used to monitor the servo press or the forming process.

In accordance with an embodiment, the torque profile belonging to the first cycle is determined via a measurement on the servo press or on a servo press of the same construction or of the same type. Consequently, the servo press is operated in a no-load operation, as it were, in order to record the associated torque profile without a forming process. By way of example, such a measurement can be implemented once during a startup or testing phase of the servo press and the control system of the servo press. Then, this measurement is used as a reference measurement for the subsequent ascertainment of the forming process characteristic. By way of example, the measurement process for the torque profile belonging to the first cycle may be repeated after a multiplicity of forming processes, particularly in order to be able to take into account aging effects on the servo press or a tool of the servo press.

For the measurement under no-load operation, care has to be taken that a stroke number that is subsequently desired for forming is set so that a sensible comparison of the torques is possible.

In accordance with another embodiment, the torque profile belonging to the first cycle is determined via a calculation based on a model, more particularly a mechatronic model, of the servo press. Advantageously, a torque profile of a motor on the servo press is reproducible as exactly as possible via the model. Here, only the kinematics of the servo press are included in the simplest model. By way of example, an effect of system deviations on the torque profile is neglected in a simple approach. This assumption is admissible in the case of typical servo presses, in particular, because the movement dynamics or the stroke number is very low in comparison with the dynamic response of the control system. Consequently, control errors are comparatively small. Advantageously, this consequently renders possible a theoretical determination of the torque profile on a motor of a servo press without a forming process. In particular, the torque behavior of servo presses can be reproduced in particularly realistic fashion by way of detailed mechatronic models.

In accordance with a further embodiment, the torque profile belonging to the second cycle is determined via a measurement on the servo press. Precisely, the torque profile during a cycle in which a forming process occurs cannot be calculated theoretically. In particular, the torque profile of the first cycle is well comparable with the torque profile of the second cycle if the torque was determined based on a measurement in each case. Irregularities or deviations that are not mapped by a model are included equally in the case of a comparison of the two torque models with and without a forming process. In the case of a comparison of the torque profile belonging to the second cycle with a torque profile belonging to the first cycle that has been ascertained via a model, irregularities of a measurement procedure without a forming process advantageously cannot have any effects.

In accordance with a further embodiment, a forming force over distance or over time is ascertained as the forming process characteristic. Consequently, the profile of the force is ascertainable as a fingerprint and, for example, storable. Here, a torque required for the forming can be converted into a force corresponding to the press force or the process force via an ascertained kinematic transformation of the press. The kinematic transformation emerges as a derivative of the stroke travel of the slide depending on the crank angle of an eccentric plate with respect to the crank angle. The plot can be implemented over distance or over time and, in particular, can be converted into one another by calculation. In particular, this can advantageously be made dependent on what reference data are available.

In accordance with a further embodiment, a maximum forming force is ascertained as the forming process characteristic. The maximum process force ascertained over the stroke travel corresponds to the maximum forming force that acts at one time, in particular. Consequently, it is advantageously possible to predetermine thresholds for a required maximally occurring forming force and an upper limit being exceeded can be determined via the process force monitoring. By way of example, a workpiece that was formed with excessive press force can then be treated as a reject.

In accordance with a further embodiment, an energy applied per stroke is ascertained as forming process characteristic. Advantageously, integrated values, such as the applied energy per stroke, are ascertainable from the evaluation of the two torque profiles. In particular, the value of the energy that must be applied on account of the forming is ascertained thereby. This relates to a specification of an energy per formed workpiece.

In accordance with another embodiment, a forming power over distance or over time is ascertained as forming process characteristic. Consequently, a statement about the power connected with the forming is advantageously possible via the relationship between the applied energy and the time of a cycle or a region of the cycle. Advantageously, plots such as a profile of the applied forming power over distance, in particular the stroke travel of the slide, or over time, in particular over the time elapsed during a cycle, are possible.

In accordance with yet a further embodiment, a maximum forming power per stroke is ascertained as forming process characteristic. Peak powers occurring in a servo press, in particular, are variables relevant to a forming process. Monitoring and restricting the latter is advantageous for the operation of a servo press apparatus.

In accordance with a further embodiment, a kinematic relation between slide and eccentric plate and a relationship between torque and current and, more particularly, furthermore an inertia of the eccentric plate and/or drivetrain, a mass of the slide, a weight compensation, determinable friction or a drive controller are included in the mechatronic model.

Consequently, it is possible within the scope of a model-based approach to calculate a map of the torque profile during a cycle of the servo press without ongoing forming that is as close to reality as possible. In particular, the model includes those factors that are required for the pure movement of the press without forming.

In accordance with a further embodiment, the torque profile belonging to the first cycle of the servo press is corrected via a noise transfer function, while taking into account measurable system deviations of the drive controller. To this end, system deviations are measured and active disturbing forces are ascertained from the measured system deviations by inverting a noise transfer function. Such disturbing forces act on the measured variables and may occur, for example, in a cycle without forming. This correction is advantageously used when measuring the torque profile in the no-load operation.

In accordance with another embodiment, the torque profile belonging to the second cycle of the servo press is corrected via a noise transfer function, taking account of measurable system deviations of the drive controller. Disturbing forces that must be compensated by the drive controller also occur for the curve of the torque profile that is ascertainable when forming takes place. With the aid of the inversion of the noise transfer function, the system deviations that may result therefrom can allow deductions to be made about the process force. Thus, the force is not directly derivable from the currents; instead, the measured torque contains inaccuracies on account of the controllers.

In a particularly advantageous manner, the two torque profiles that are used for the comparison are corrected in view of system deviations caused by disturbing forces. In this way, the controller effect, which has different effects on the torque profile with and without forming process, can advantageously be taken into account and no falsifications occur on account of the deviations. With the measured system deviations and with the aid of the inverse of the noise transfer function, the torque profile for the case without forming can be taken into account both for the case of a measurement during no-load operation and for the case of a reproduction of the torque profile by the model. In particular, in the case of the reproduction of the torque profile by the model, the noise contribution is included directly in the model.

In accordance with another embodiment, the ascertained forming process characteristic is compared to at least one reference forming process characteristic or to a range of reference forming process characteristics, and an indication is triggered if the comparison yields a deviation or a deviation by a predetermined threshold value. Consequently, the forming process can be monitored by virtue of resorting to known reference values that were found to be good. Advantageously, a range within which an ascertained forming process characteristic should move is specified. Advantageously, deviations are possible up to a value that can be set or, in particular, the deviations do not trigger a further event such as an indication or error message, for example. In particular, ascertaining the forming process characteristic, comparing the latter to the reference forming process characteristic and, where necessary, indicating occur during each forming process or each stroke cycle, for example, even independently of occurring forming.

It is also an object of the invention to provide an analysis unit including a processor and memory for ascertaining a forming process characteristic of a servo press, the analysis unit comprises a first unit for determining a torque profile of a motor of the servo press, where the torque profile belongs to a first cycle of the servo press, and where the first cycle describes a forming process without an item to be processed by the servo press; a second unit for determining a torque profile of the motor of the servo press, where the torque profile here belongs to a second cycle of the servo press, and where the second cycle describes a forming process with an item to be processed by the servo press; and a third unit for ascertaining the at least one forming process characteristic from a comparison of the torque profile belonging to the first cycle with the torque profile belonging to the second cycle. In accordance with an embodiment, the analysis unit is integrated into a servo press controller.

In one embodiment, the analysis unit further comprises an indication unit for indicating an ascertained deviation of the ascertained forming process characteristic from a reference forming process characteristic or a range of reference forming process characteristics. By way of example, a monitor is provided, via which a status is displayable. By way of example, only a fault message is indicated, which is signaled in the form of a lit-up lamp, for example. Alternatively, details such as the forming process characteristic itself or a stored history of forming process characteristics may be displayed via the monitor.

In accordance with another embodiment, the analysis unit is further provided with an interface to an edge device or a cloud service for transmitting ascertained forming process characteristics or ascertained forming process characteristics and associated servo press characteristics or material characteristics or process characteristics and/or for receiving reference forming process characteristics or suggested action data based on transmitted ascertained forming process characteristics, the suggested action data having been evaluated by a cloud service.

Advantageously, this provides a control system that determines and indicates a characteristic fingerprint for a forming process. A link to an edge device or a cloud facilitates storage of own ascertained fingerprints and, advantageously, also facilitates a comparison with known earlier fingerprints or fingerprints of comparable forming processes of other operators of servo press apparatuses. By way of example, correlations relating to occurring forming process characteristics and material or tool, etc., are ascertained with the aid of cloud applications and these correlations can be used by an operator of the servo press to improve the settings or processes on their own press.

The invention further relates to a non-transitory computer-readable medium with a computer program, having means for implementing the method in accordance with any one of the above-described embodiments when the computer program is executed on a program-controlled device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

With the aid of the figures, the invention will be explained in more detail below on the basis of exemplary embodiments, in which.

DETAILED DESCRIPTION OF THE EXEMPLARY EMBODIMENTS

A first exemplary embodiment of the invention describes a particularly advantageous realization of process monitoring for a servo press, in which data from a model are resorted to for a forming process diagnosis of a forming process via a servo press. It should be possible to resort to a forming characteristic for the purposes of monitoring the forming procedure. This forming characteristic provides a statement as to whether a process is implemented as intended. To this end, the behavior of a servo press without forming occurring is compared with the behavior of the same servo press with a forming process, i.e., with material introduced or possibly transported in the press, said material being formed or pressed.

The behavior of the servo press with a forming process is examined based on a measured torque profile and the behavior of the servo press without a forming process is examined based on a calculated torque profile, this being followed by further processing of the values of the respective torque profiles.

Initially, a torque profile as to be expected without material inserted, i.e., without a forming process, should be ascertained for the servo press to this end. To do this, model knowledge about the press is used, this taking account of the inertias of an eccentric plate and of a drivetrain of the servo press, the mass of the slide of the servo press, a kinematic relation between slider and eccentric plate, a consideration of the weight comparison, friction assumed as known and, optionally, further modeled variables. Depending on the type of the servo press, an eccentric plate kinematic is included, for example, or a kinematic as may be assumed for a draw crank-type servo press or a toggle servo press or a link drive servo press.

Advantageously, system deviations should be taken into account in addition to the parameters included in the press model. Advantageously, the calculated torque profile can be corrected via an additional controller model. The controller model includes parameters that reflect delays in the control that occur on account of the drive controllers.

Moreover, a torque profile when forming occurs should also be ascertained in any temporal sequence in relation to the ascertainment of the torque profile without a forming process. This is implemented by a measurement. A clear difference will be seen in a region of the forming when comparing the two ascertained torque profiles. This difference arises as a result of the force to be applied for the forming.

The measured curve of the torque profile with forming also is corrected in terms of inaccuracies on account of system deviations that were ascertained within the scope of the measurement during the forming. To this end, the change in the torque on account of the installed drive controllers is removed by calculation via an inverse of a noise transfer function.

Figure 1:
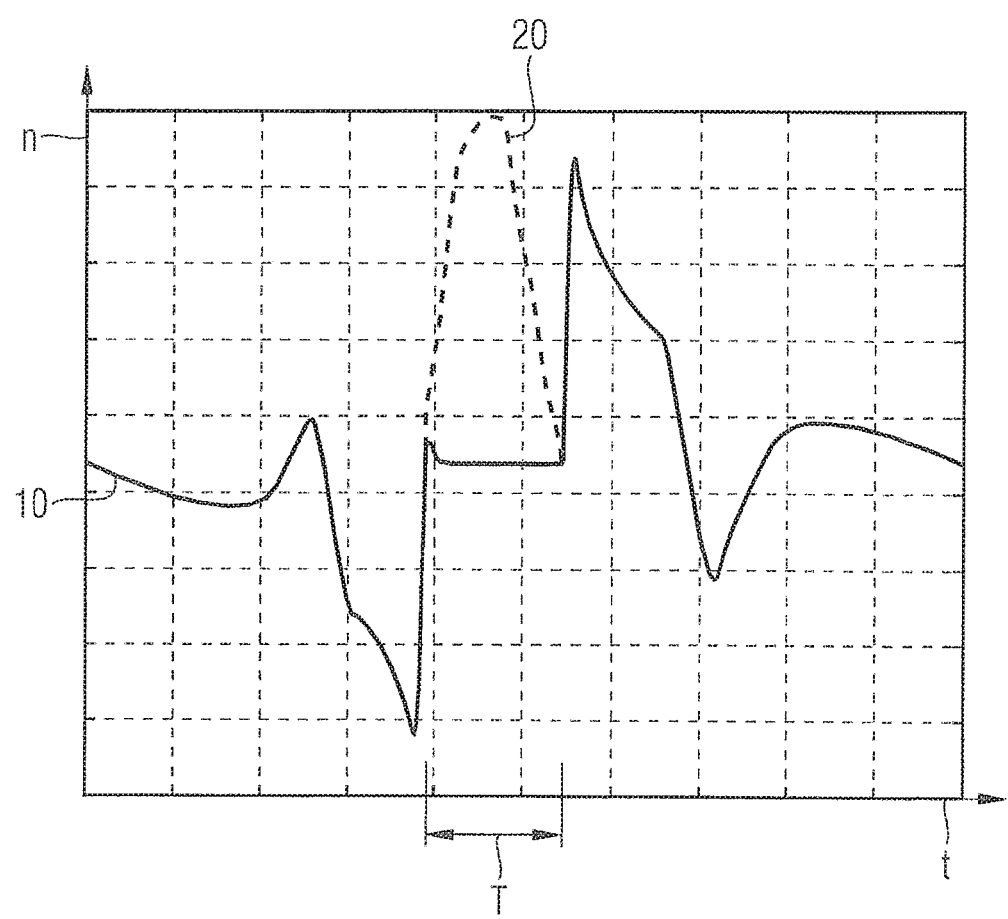
FIG. 1 shows a schematic illustration of a torque profile during a cycle without a forming process and a cycle with a forming process, in a diagram in accordance with an exemplary embodiment of the invention.

FIG. 1 plots both torque curves in an exemplary manner. A solid curve elucidates the torque profile 10, which belongs to a first cycle of the servo press during which no forming occurs. The dashed curve shows the torque curve 20, which belongs to a second cycle with a forming process, in the relevant section where forming occurs. The curves elucidate the profile of the torques, with the y-axis plotting the torque n depending on a time t, which is plotted along the x-axis.

A pronounced deviation can be noticed in the temporal range of the forming time interval T, it being possible to trace back this deviation to the forming. Outside of this region, curves with approximately the same profile can be observed. How well the curves lie on top of one another outside of the forming time interval T depends on the quality of the selected model in particular. Further, a deviation may occur if the modeled curve was calculated while neglecting certain parameters, such as friction or occurring system deviations, for example.

Consequently, the region outside of the forming procedure also serves as a reference region for estimating the quality of the employed model.

The region within the forming time interval T is relevant for the ascertainment of the forming process characteristic.

A desired forming process characteristic can be derived in different ways from the comparison of the two torque profiles 10, 20.

By way of example, the press force on account of the forming occurs should be plotted over the forming travel. This is elucidated in FIG. 2. To this end, the measured torque profile in the region of the forming time interval is corrected by the profile of the torques on the motors that also occur without forming. Consequently, only the area between the two curves is considered relevant to the ascertainment of the process force.

Figure 3:
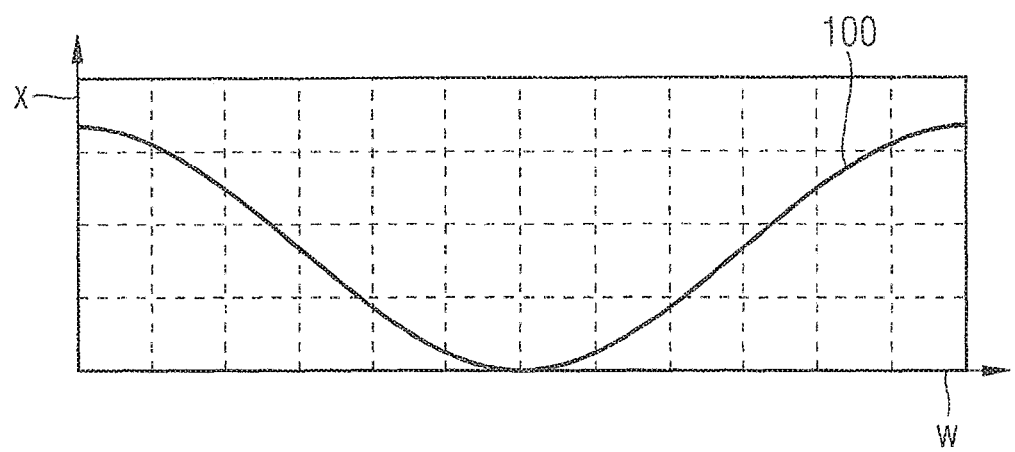
FIG. 3 is a graphical plot in a schematic illustration of the kinematics of a servo press in accordance with the invention.

A torque curve caused by forming over time is now present as an intermediate result. Now, the conversion into a process force or press force can be implemented with the aid of a kinematic transformation that is applicable to the servo press. In this respect, FIG. 3 elucidates the relationship between the crank angle of an eccentric plate, and hence of the actual position value of the motor, and a stroke travel of the slide. The stroke travel x is plotted along the y-axis; the crank angle w is plotted along the x-axis. Consequently, this plots the curve 100 of the stroke over one stroke cycle. FIG. 3 plots the curve 100 over a range from a crank angle w of 0° up to a crank angle w of 360°.

Figure 4:
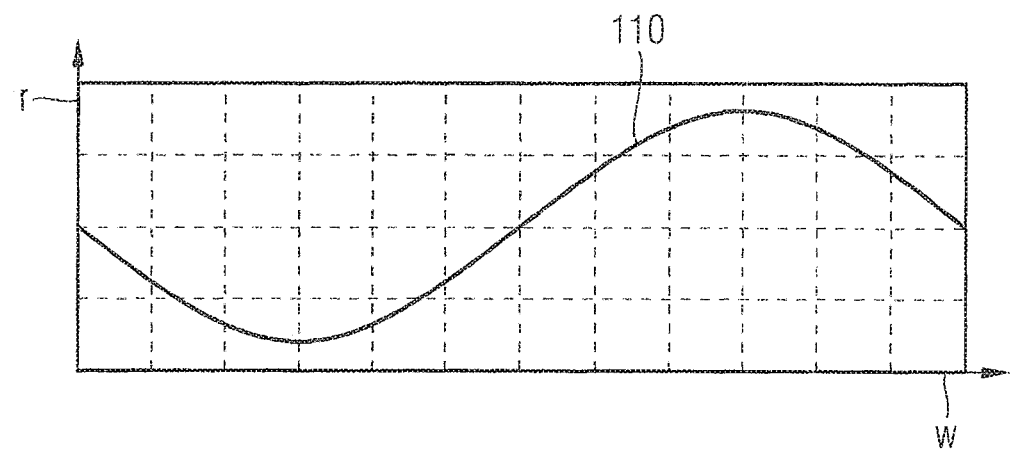
FIG. 4 is a graphical plot in a schematic illustration in accordance with the invention of the kinematic transformation of the servo press.

FIG. 4 shows the kinematic transformation 110, i.e., the derivative of the curve of the stroke, illustrated in FIG. 3, with respect to crank angle w. The y-axis plots the effective radius r; the x-axis once again plots the crank angle w. The effective radius can also be referred to as variable gear transmission.

Using this kinematic transformation 110, it is now possible to perform the conversion of the torque required for the forming into a force required for the forming. By way of example, dividing the forming torque at a crank angle by the kinematic transformation at the same crank angle yields the sought-after press force. As a relationship:

$$F\_\text{forming}(phi) = -M\_\text{forming}(phi) / (d\ x(phi)/d\ phi) \quad \text{Eq. 1}$$

Figure 2:
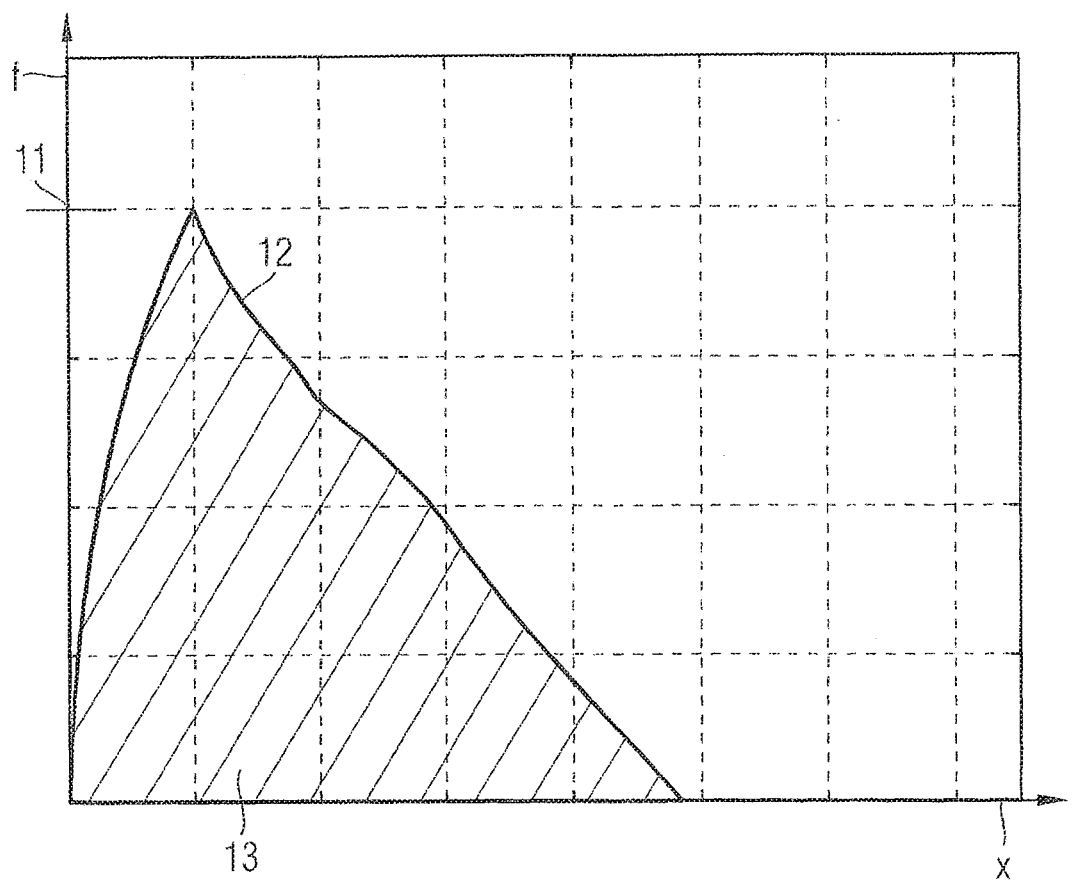
FIG. 2 is a graphical plot in a schematic illustration of an ascertained process force against forming distance in accordance with the invention.

The representation can then be implemented, as shown in FIG. 2, as a process force curve 12 over travel x. Once again, the x-axis shows the stroke travel x. The y-axis shows the process force f. This information can now be used for process force monitoring. Advantageously, conventional monitoring with complex additional sensor systems is dispensed with. By way of example, a maximum forming force 11 or an integrated characteristic, such as the forming energy per forming process or per workpiece, for which the integral 13 of the process force profile 12 over the stroke travel x is formed, is ascertained as the forming process characteristic.

Further, forming process characteristics that take account of the entire stroke and/or the entire cycle of a forming procedure, including the periods during which no forming force acts, are also conceivable, such as an overall amount of energy per workpiece.

The ascertained characteristic is compared with a reference characteristic. By way of example, these were obtained from the forming of a reference part or are provided by a remote service or a cloud service or are available within the press apparatus. A user advantageously specifies limits of admissible deviations. If these are exceeded, a defined procedure is triggered, for example, a traffic light-type display on a controller, an alarm or a shutdown of processing or a servo press.

The characteristic parameters and a history of ascertained forming process characteristics, which advantageously may serve as reference values again, are stored, for example, within the controller. Additionally, these data may be collected externally, for example, by virtue of being transmitted to a cloud service.

Consequently, a process for monitoring a forming process advantageously arises. A characteristic fingerprint for a forming process is determined and, in particular, indicated. By assessing ascertained forming process characteristics, for example, based on a quality of the formed workpiece, the monitoring can become ever more refined over time. Advantageously, correlations can be determined by recording a history of forming process characteristics and associated forming information items, such as the employed material or an employed tool.

In order to be able to use the best-possible model of the torque profile on the servo press without a forming process, the influence of variables, such as friction or weight compensation, is ascertained at different press speeds, such as during the start up. Hence, the model is parameterized and the model with corresponding parameters like during the forming is resorted to for a subsequently occurring forming procedure and the process monitoring thereof.

Already available data in a servo press controller are processed and consequently new characteristics in the forming process or on the workpiece are converted into an evaluable form. Hence, insights are obtained for further optimization of the press or the process. Furthermore, the forming process characteristics processed thus can be used for monitoring the press or the process.

Figure 5:
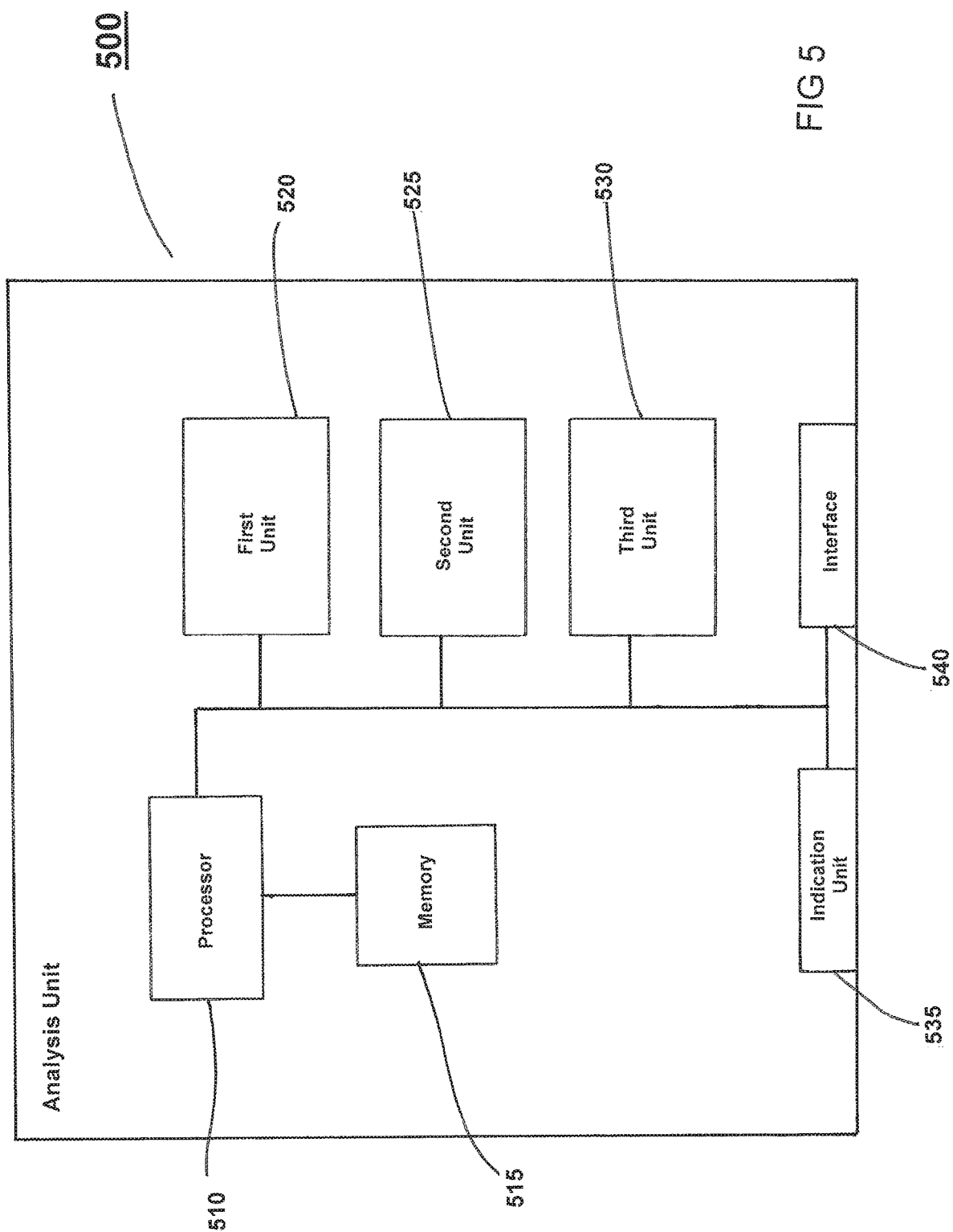
FIG. 5 is a schematic illustration of an analysis unit in accordance with the invention.

FIG. 5 is a schematic block diagram of an analysis unit 500 for ascertaining a forming process characteristic 11, 12, 13 of a servo press. As shown in FIG. 5, the analysis unit comprises a processor 510 and memory 515 that is accessed by the processor 510. The analysis unit 500 additionally includes a first unit 520 for determining a torque profile 10 of a motor of the servo press, where the torque profile belongs to a first cycle of the servo press, and the first cycle describes a forming process without an item to be processed by the servo press.

Also included is a second unit 525 for determining a torque profile 20 of the motor of the servo press, where the torque profile belongs to a second cycle of the servo press, and the second cycle describes a forming process with an item to be processed by the servo press.

The analysis unit 500 is additionally provided with a third unit 530 for ascertaining the at least one forming process characteristic 11, 12, 13 from a comparison of the torque profile 10 belonging to the first cycle with the torque profile 20 belonging to the second cycle.

In an embodiment, the analysis unit 500 is provided with an indication unit 535 for indicating an ascertained deviation of the ascertained forming process characteristic from a reference forming process characteristic or a range of reference forming process characteristics. In another embodiment, the analysis unit 500 is provided with an interface 540 to an edge device or a cloud service (not shown) for transmitting ascertained forming process characteristics or ascertained forming process characteristics and associated servo press characteristics or material characteristics or process characteristics and/or for receiving reference forming process characteristics or suggested action data on the basis of transmitted ascertained forming process characteristics, with the suggested action data having been evaluated by a cloud service.

Figure 6:
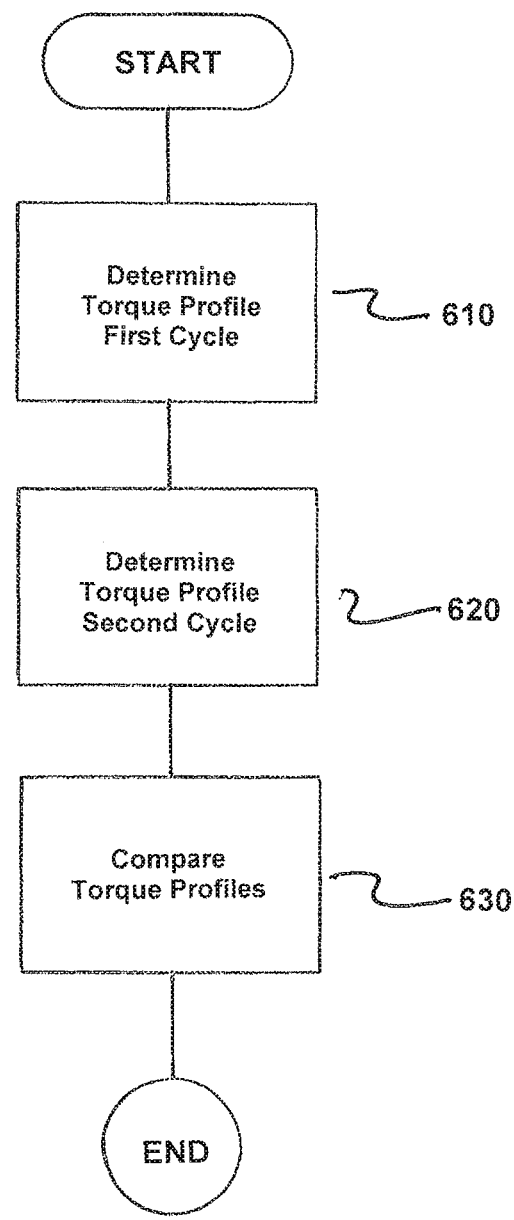
FIG. 6 is a flowchart of the method in accordance with the invention.

FIG. 6 is a flowchart of the method for determining at least one forming process characteristic of a servo press. The method comprises determining a torque profile 10 of a motor of the servo press, as indicated in step 610. In accordance with the invention, the torque profile belongs to a first cycle of the servo press, where the first cycle describes a forming process without an item to be processed by the servo press.

Next, a torque profile 20 of the motor of the servo press is determined, as indicated in step 620. Here, the torque profile belongs to a second cycle of the servo press, where the second cycle describes a forming process with an item to be processed by the servo press.

Next, the torque profile 10 belonging to the first cycle is compared with the torque profile 20 belonging to the second cycle to ascertain the at least one forming process characteristic 11, 12, 13, as indicated in step 630.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for determining at least one forming process characteristic of a servo press, the method comprising:
    determining a torque profile over time of a motor of the servo press, said torque profile belonging to a first cycle of the servo press, and the first cycle describing a forming process without an item to be processed by the servo press;
    determining a torque profile over time of the motor of the servo press, said torque profile belonging to a second cycle of the servo press, the second cycle describing a forming process with an item to be processed by the servo press;
    comparing the torque profile over time belonging to the first cycle with the torque profile over time belonging to the second cycle to ascertain the at least one forming process characteristic of the servo process; and
    operating the servo press based on the ascertained at least one forming process characteristic of the servo process.

2. The method as claimed in claim 1, wherein the torque profile belonging to the first cycle is determined via a measurement one of (i) on the servo press and (ii) on a servo press of the same construction or the same type.

3. The method as claimed in claim 1, wherein the torque profile belonging to the first cycle is determined via a calculation based on a model of the servo press.

4. The method as claimed in claim 3, wherein the model is a mechatronic model.

5. The method as claimed in claim 1, wherein the torque profile belonging to the second cycle is determined via a measurement on the servo press.

6. The method as claimed in claim 1, wherein a forming force over distance or over time is ascertained as the forming process characteristic.

7. The method as claimed in claim 1, wherein a maximum forming force is ascertained as the forming process characteristic.

8. The method as claimed in claim 1, wherein an energy applied per stroke is ascertained as the forming process characteristic.

9. The method as claimed in claim 1, wherein a forming power over distance or over time is ascertained as the forming process characteristic.

10. The method as claimed in claim 1, wherein a maximum forming power per stroke is ascertained as the forming process characteristic.

11. The method as claimed in claim 3, wherein a kinematic relation between a slide and an eccentric plate and a relationship between torque and current are included in the mechatronic model.

12. The method as claimed in claim 11, wherein an inertia of the at least one of (i) the eccentric plate and (ii) the drivetrain, a mass of the slide, a weight compensation, determinable friction or a drive controller are furthermore included in the mechatronic model.

13. The method as claimed in claim 1, wherein the torque profile over time belonging to the first cycle of the servo press is corrected via a noise transfer function, taking into account measurable system deviations of a drive controller.

14. The method as claimed in claim 1, wherein the torque profile over time belonging to the second cycle of the servo press is corrected via a noise transfer function, taking into account measurable system deviations of a drive controller.

15. The method as claimed in claim 1, wherein the ascertained forming process characteristic is compared to at least one of (i) at least one reference forming process characteristic and (ii) a range of reference forming process characteristics, and an indication is triggered if the comparison yields a deviation or a deviation by a predetermined threshold value.

16. An analysis unit for ascertaining a forming process characteristic of a servo press, comprising:
    a processor;
    memory accessed by the processor;
    a first unit for determining a torque profile over time of a motor of the servo press, said torque profile over time belonging to a first cycle of the servo press, the first cycle describing a forming process without an item to be processed by the servo press;
    a second unit for determining a torque profile over time of the motor of the servo press, said torque profile over time belonging to a second cycle of the servo press, the second cycle describing a forming process with an item to be processed by the servo press; and
    a third unit for ascertaining the at least one forming process characteristic from a comparison of the torque profile over time belonging to the first cycle with the torque profile over time belonging to the second cycle;
    wherein the servo press is operated based on the ascertained at least one forming process characteristic of the servo process.

17. The analysis unit as claimed in claim 16, wherein the analysis unit is integrated in a servo press controller.

18. The analysis unit as claimed in claim 16, further comprising:
    an indication unit for indicating an ascertained deviation of the ascertained forming process characteristic from one of (i) a reference forming process characteristic and (ii) a range of reference forming process characteristics.

19. The analysis unit as claimed in claim 17, further comprising:
    an indication unit for indicating an ascertained deviation of the ascertained forming process characteristic from one of (i) a reference forming process characteristic and (ii) a range of reference forming process characteristics.

20. An analysis unit comprising:
    a processor;
    memory accessed by the processor;
    an interface to an edge device or a cloud service for at least one of:
        transmitting one of (i) ascertained forming process characteristics (11, 12, 13) and (ii) ascertained forming process characteristics and associated servo press characteristics, (iii) material characteristics and (iv) process characteristics and
        receiving one of (i) reference forming process characteristics and (ii) suggested action data based on transmitted ascertained forming process characteristics, said suggested action data having been evaluated by the cloud service;
    wherein the analysis unit is configured to:
        determine a torque profile over time of a motor of a servo press, said torque profile belonging to a first cycle of the servo press, and the first cycle describing a forming process without an item to be processed by the servo press;
        determine a torque profile over time of the motor of the servo press, said torque profile belonging to a second cycle of the servo press, the second cycle describing a forming process with an item to be processed by the servo press;
        compare the torque profile over time belonging to the first cycle with the torque profile over time belonging to the second cycle to ascertain forming process characteristic of a servo process; and
        operate the servo press based on the ascertained at least one forming process characteristic of the servo process.

21. A non-transitory computer-readable medium encoded with a computer program when, when executed by a program-controlled device, causes determination of at least one forming process characteristic of a servo press, the computer program comprising:
    program code for determining a torque profile over time of a motor of the servo press, said torque profile over time belonging to a first cycle of the servo press, and the first cycle describing a forming process without an item to be processed by the servo press;
    program code for determining a torque profile over time of the motor of the servo press, said torque profile over time belonging to a second cycle of the servo press, a second cycle describing a forming process with an item to be processed by the servo press; and
    program code for comparing the torque profile over time belonging to the first cycle with the torque profile over time belonging to the second cycle to ascertain the at least one forming process characteristic;
    wherein the servo press is operated based on the ascertained at least one forming process characteristic of the servo process.

* * * * *